(12) United States Patent
Toyooka et al.

(10) Patent No.: US 7,077,038 B2
(45) Date of Patent: Jul. 18, 2006

(54) SCREW HAVING NON-STRIP DRIVE RECESS AND DRIVER BIT FOR USE WITH THE SCREW

(75) Inventors: Toshimasa Toyooka, Ayabe (JP); Shinichi Hamano, Miyazu (JP)

(73) Assignee: Nitto Seiko Co., Ltd., Kyoto (JP)

( * ) Notice: Subject to any disclaimer, the term of this patent is extended or adjusted under 35 U.S.C. 154(b) by 97 days.

(21) Appl. No.: 10/856,165

(22) Filed: May 28, 2004

(65) Prior Publication Data

US 2005/0047891 A1    Mar. 3, 2005

(30) Foreign Application Priority Data

May 30, 2003   (JP)  .............................. 2003-155321

(51) Int. Cl.
   *B25B 23/00*   (2006.01)
(52) U.S. Cl. .............................. 81/460; 81/436; 81/461
(58) Field of Classification Search .................. 81/460, 81/436, 461; 411/404
   See application file for complete search history.

(56) References Cited

U.S. PATENT DOCUMENTS

| 2,285,461 | A |   | 6/1942  | Purtell |
| 2,800,829 | A | * | 7/1957  | West ........................... 411/404 |
| 3,269,250 | A |   | 8/1966  | Curtiss |
| 4,084,478 | A | * | 4/1978  | Simmons ...................... 411/404 |
| 4,258,596 | A | * | 3/1981  | Bisbing et al. ................ 81/436 |
| 4,670,927 | A | * | 6/1987  | Vaughn .......................... 470/9 |
| 5,120,173 | A | * | 6/1992  | Grady ......................... 411/404 |
| 5,549,431 | A | * | 8/1996  | Royle .......................... 411/389 |
| 5,928,468 | A | * | 7/1999  | Tolson ......................... 156/578 |
| 6,016,727 | A | * | 1/2000  | Morgan ......................... 81/436 |
| 6,223,634 | B1| * | 5/2001  | Hughes et al. ................. 81/460 |
| 6,253,649 | B1| * | 7/2001  | Shinjo .......................... 81/460 |
| 6,293,745 | B1| * | 9/2001  | Lu .............................. 411/410 |
| 6,886,433 | B1| * | 5/2005  | Totsu ........................... 81/460 |
| 6,951,158 | B1| * | 10/2005 | Edland ......................... 81/460 |

FOREIGN PATENT DOCUMENTS

| JP | 08-145024   | 6/1996  |
| JP | 11-311226   | 11/1999 |
| JP | 2002-266827 | 9/2002  |
| JP | 2003-013924 | 1/2003  |

* cited by examiner

*Primary Examiner*—Lee D. Wilson
*Assistant Examiner*—Alvin J. Grant

(57) ABSTRACT

The present invention provides a screw, comprising a screw head having a drive recess and a screw shank having threads and being integrally formed with the screw head, wherein the drive recess includes a plurality of engaging grooves equiangularly radiating from an axis of the screw in plan view, a bottom face of each engaging groove having a steep slope, which is near to the screw shank, and a gentle slope, which is far from the screw shank, for enlarging the engaging area of the engaging grooves.

5 Claims, 9 Drawing Sheets

SCREW HAVING NON-STRIP DRIVE RECESS AND DRIVER BIT FOR USE WITH THE SCREW

This application is based on application NO. 2003-155321 filed in Japan, the content of which is hereby incorporated by reference.

BACKGROUND OF THE INVENTION (1) Field of the Invention

The present invention relates to a screw having a drive recess that is not easily stripped off when a driver bit is engaged with the drive recess and strong driving force is applied to the recess. Also, the present invention relates to a driver bit for use with the screw.

(2) Description of the Related Art

A screw having a drive recess, which consists of a screw head with the drive recess and a screw shank with threads, is used in every field as a fastening part for assembling a product, attaching parts to a workpiece and so on.

FIG. 1 is a cutaway view showing a shape of a drive recess 110 of a conventional screw 101 having a drive recess (a screw having a drive recess is hereinafter simply called the "screw").

The drive recess 110, which is substantially in cross shape as seen in plan view, is formed on top of a screw head 102 of the screw 101. A drive head of a driver bit is to be inserted into the driver recess 110 in such a manner that an engaging blade, which is formed on the drive head of the driver bit, is engaged with an engaging groove 111. As the driver bit is inserted and driven rotatively, the screw 101 is fastened to a workpiece.

Recently, with the miniaturization of workpieces and products, screws used therefor are becoming comparatively smaller.

If a screw becomes smaller, the drive recess 110 thereof correspondingly becomes smaller. It results that the engaging groove 111 of the driving recess 110 also becomes smaller, and it sometimes happens that the engaging groove 111 can not withstand strong driving force and therefore stripped off, and it becomes impossible to fasten the screw 101 tight.

To solve such a problem, for instance, the engaging portion may be made larger as much as possible by deepening the drive recess 110. However, when the drive recess is deepened, the bottom of the drive recess 110 gets into the screw shank, and the portion around the junction of the screw head and the screw shank (called a neck portion) becomes thinner. As a result, the mechanical strength around the neck portion is deteriorated and the screw head might come off, which is called "head come-off" phenomenon.

SUMMARY OF THE INVENTION

The first object of the present invention is therefore to provide a screw that is configured to have engaging grooves of a drive recess which are not easily stripped off and surely receive strong driving force even if the drive recess is comparatively shallow.

The second object of the present invention is to provide a driver bit having engaging blades whose shapes are suitable for applying driving force to the screw above.

The first object is fulfilled by a screw, comprising: a screw head having a drive recess which is for engagement with a drive head of a driver bit; and a screw shank having threads and being integrally formed with the screw head, wherein the drive recess includes a plurality of engaging grooves equiangularly radiating from an axis of the screw in plan view, a bottom face of each engaging groove having a first groove slope and a second groove slope, the first groove slope is nearer to the screw shank than the second groove slope, and an inclination angle $\alpha$ of the second groove slope to the axis of the screw is larger than an inclination angle $\beta$ of the first groove slope to the axis of the screw.

According to the stated construction, the area of the engaging walls of each engaging groove, which receive rotative driving force applied by a driver bit, can be enlarged without making the drive recess deep. As the area of the engaging walls are enlarged, the suppress strength per unit area applied to the engaging walls is reduced, and therefore the drive recess is not easily stripped off even when a strong driving force is applied by the driver bit.

Here, it is preferable that the inclination angle $\alpha$ is less than or equal to twice the inclination angle $\beta$.

Also, it is preferable that when a depth of the drive recess in a direction of the axis is d, a height of a boundary between the first groove slope and the second groove slope from a starting point is within a range of 0.5d to 0.7d, the starting point being at a deepest position in the drive recess.

The second object is fulfilled by a driver bit having a drive shaft and a drive head formed on a tip of the drive shaft, the drive head being for engagement with the above-descried drive recess, the driver bit comprising: a plurality of engaging blades formed on the drive head so as to equiangularly radiate from an axis of the drive shaft in plan view, wherein a surface of each engaging blade including a ridge thereof has a first blade slope and a second blade slope, the first blade slope is nearer to the tip of the drive head, and an inclination angle of the second blade slope to the axis of the drive shaft is larger than an inclination angle of the first blade slope to the axis of the drive shaft.

Here, it is preferable that when the drive head is engaged with the above-described drive recess, the surface of each engaging blade fits surfaces of the first groove slope and the second groove slope of each engaging groove included in the drive recess.

According to the stated construction, the contacting area between the drive recess and the engaging blades of the driver bit can be surely enlarged, and this ensures stable and secure transmission of the driving force.

BRIEF DESCRIPTION OF THE DRAWINGS

These and the other objects, advantages and features of the invention will become apparent from the following description thereof taken in conjunction with the accompanying drawings which illustrate specific embodiments of the invention. In the drawings.

DESCRIPTION OF THE PREFERRED EMBODIMENT

The following describes preferred embodiments of the present invention with reference to the figures.

The First Embodiment (1) Construction of a Screw

Figure 2:
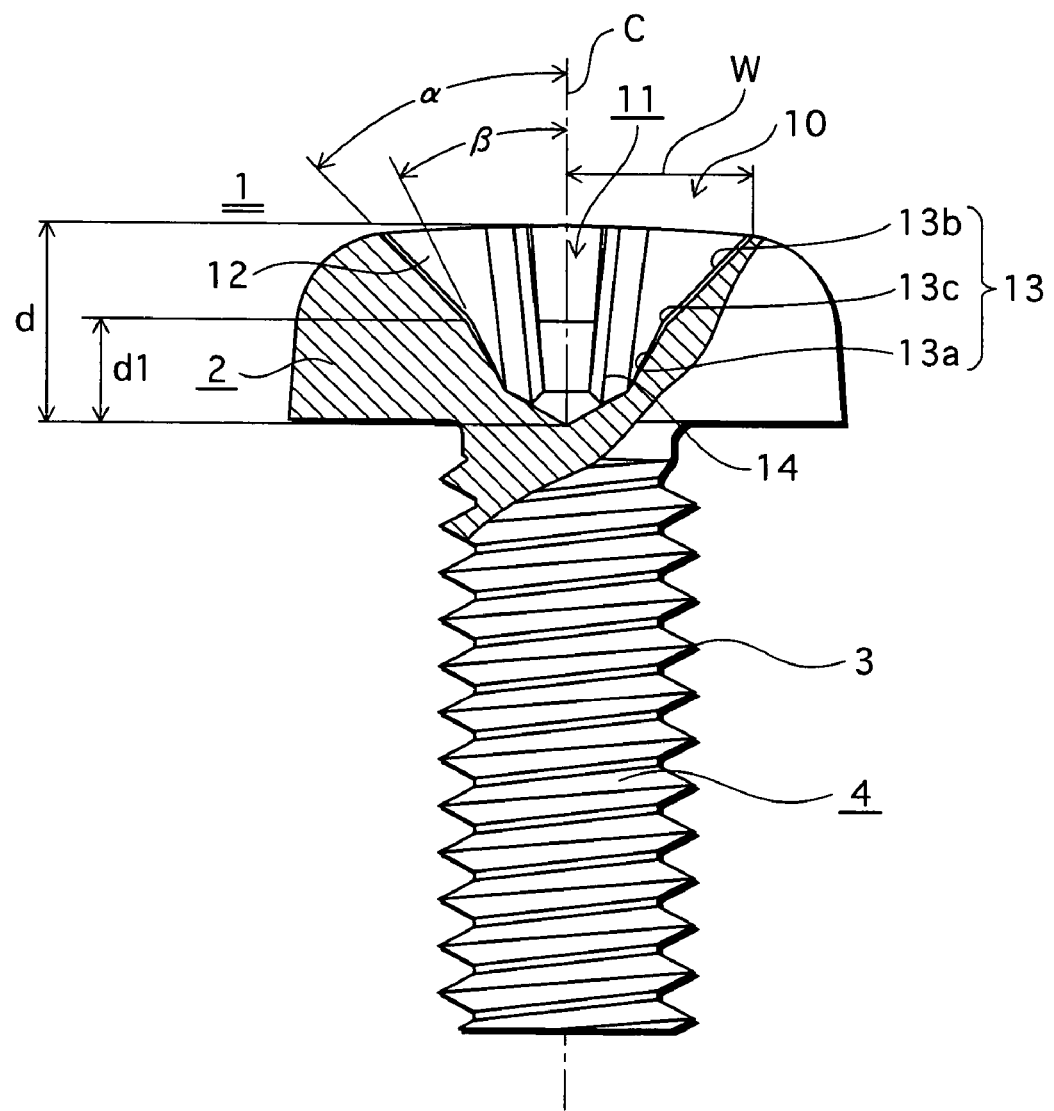
FIG. 2 is a cutaway view showing a shape of a principal portion of a drive recess of a screw according to the first embodiment of the present invention.
Figure 3:
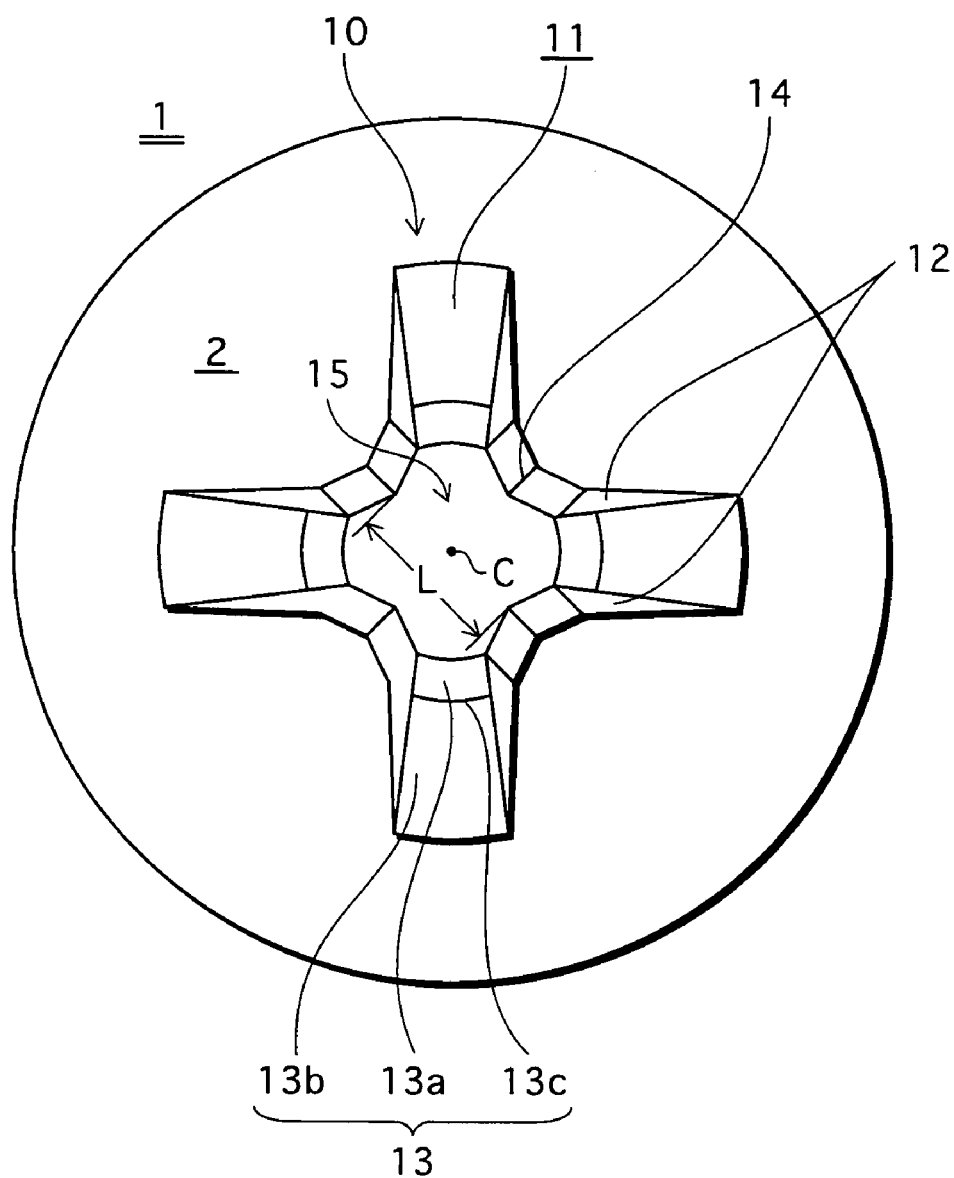
FIG. 3 is an enlarged plan view of a screw head of the screw in FIG. 2.

FIG. 2 is a cutaway view showing a shape of a portion of a drive recess of a screw 1 according to the first embodiment of the present invention, and FIG. 3 is an enlarged plan view of a screw head 2 of the screw 1 in FIG. 2.

As FIG. 2 shows, the screw consists of the screw head 2 and a screw shank 4 on which threads 3 are formed. The screw shank 4 is integrally formed with the screw head 2. The screw head 2 of the screw 1 has a drive recess 10, with which a drive head 22 of a driver bit 20 shown in FIG. 4 described later is to be engaged.

The drive recess 10 is radiated from an axis C of the screw 1 as an enlarged plan view in FIG. 3 shows, and consists of four engaging grooves 11 disposed equiangularly and a central hole 15 formed around the axis C.

Note that although four engaging grooves are formed so as to be in cross shape in this embodiment, the number of the engaging grooves is not limited to four, and any number is acceptable as long as it is more than one.

Lateral faces of each engaging groove 11 are engaging walls 12 which are to be engaged with the engaging blades of the driver bit and receive a driving force. Between the engaging walls of each engaging groove 11, a bottom face 13 of the engaging groove 11 is formed.

As FIG. 2 shows, the bottom face 13 consists of a steep slope 13a (the first slope) which is at a deep position of the drive recess (near the screw shank 4) and a gentle slope 13b (the second slope) which is gentler than the steep slope 13a and near the top face of the screw head 2 (far from the screw shank 4).

Note that in this embodiment, a boundary 13c between the steep slope 13a and the gentle slope 13b is at an approximate middle point of the driver recess 10 in depth direction.

When an inclination angle of the gentle slope 13b to the axis C is $\alpha$, and an inclination angle of the steep slope 13a to the axis C is $\beta$, $\alpha$ and $\beta$ are set to be $\beta<\alpha$. Therefore, a distance W from the axis C to the outer edge of the engaging groove 11 is longer than that of a conventional screw.

Note that the inclination angle of a bottom face of the drive recess, with which the drive head is engaged (the inclination angle $\beta$ in this embodiment), is provided by industrial standards. For instance, JIS (Japanese Industrial Standards) provides 26° as the inclination angle $\beta$.

Figure 1:
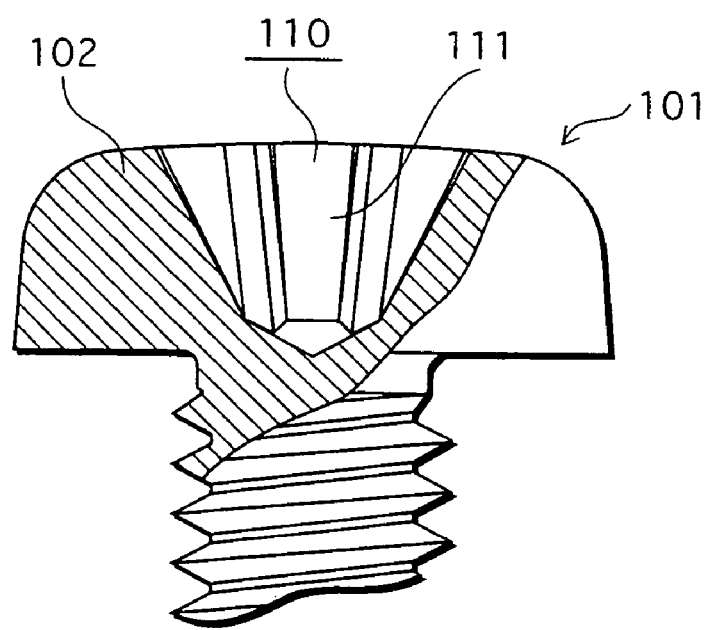
FIG. 1 is a cutaway view of a principal portion of a conventional screw for explaining a shape of its drive recess.

By creating the gentle slope 13b which inclines outward on the bottom face of the engaging groove 11 as described above, the area of the engaging wall 12 can be larger than that of the drive recess 110 of the conventional screw shown in FIG. 1, and accordingly suppress strength per unit area receiving from the engaging blade of the driver bit can be reduced. Therefore the engaging groove 11 becomes strip resistant. Also, there is no need to deepen the drive recess, and accordingly there is no possibility of deterioration of the mechanical strength around the neck portion which occurs when the thickness of the neck portion is reduced.

Note that as FIG. 2 shows, the cut surfaces of the steep slope 13a and the gentle slope 13b, cut along a plane including the axis C, are straight lines or curves which are almost straight. The drive recess in this shape is easily manufactured, and it is also easy to measure the depth of the engaging groove 11, which means that the quality control is easy.

(2) The Inclination Angle $\alpha$ of Gentle Slope 13b, and the Shifting Point from the Steep Slope to the Gentle Slope From the viewpoint of enlarging the area engaging with the driver bit as described above, it is preferable to enlarge the area of the engaging wall 12 by making the inclination angle $\alpha$ large and/or disposing the boundary 13c, where the steep slope 13a shifts to the gentle slope 13b, at a position near the bottom face of the drive recess 10.

However, if the shifting point from the steep slope 13a to the gentle slope 13b is disposed near the bottom face of the drive recess 10, in other words if the rate of the steep slope 13a in the engaging groove 11 is made less than a certain rate, the slopes do not fit the drive head of the driver bit well, and the operationality of the driver bit in tightening the screw becomes worse.

From the viewpoint described above, by making prototypes and carrying out experiments repeatedly, the inventor of the present invention confirmed that when the depth of the boundary 13c between the steep slope 13a and the gentle slope 13b in the direction of the axis C is "d1" and the depth of the drive recess is "d", a preferable range of the depth "d1" is $0.5d \leq d1 \leq 0.7d$.

Also, the diameter of the screw head 2 should be determined according to the industrial standards. If the engaging groove 11 is extended too long toward the circumference, the mechanical strengths of the screw head 2 and the neck portion of the screw 1 is deteriorated, therefore the inclination angle of gentle slope 13b has an upper limit. In order to keep the mechanical strength at a required level, it is preferable that the inclination angle $\alpha$ is less than twice the inclination angle $\beta$. In other words, a possible range of $\alpha$ is $\beta<\alpha \leq 2\beta$.

Further, for keeping an adequate mechanical strength and avoiding the drive recess from being stripped off, a preferable range of $\alpha$ is $1.15\beta \leq \alpha \leq 1.92\beta$.

(3) Shape of the Tip of the Driver Bit

The screw 1 with the drive recess 10 can be tightened with use of a conventional driver bit with a usual drive head in cross-shape. However, the advantageous effect of the screw 1 is to be gained more efficiently when a driver bit 20 of which a drive head is specially made to fit the drive recess 10 of the screw 1 as FIG. 4 and FIG. 5 show.

Figure 4:
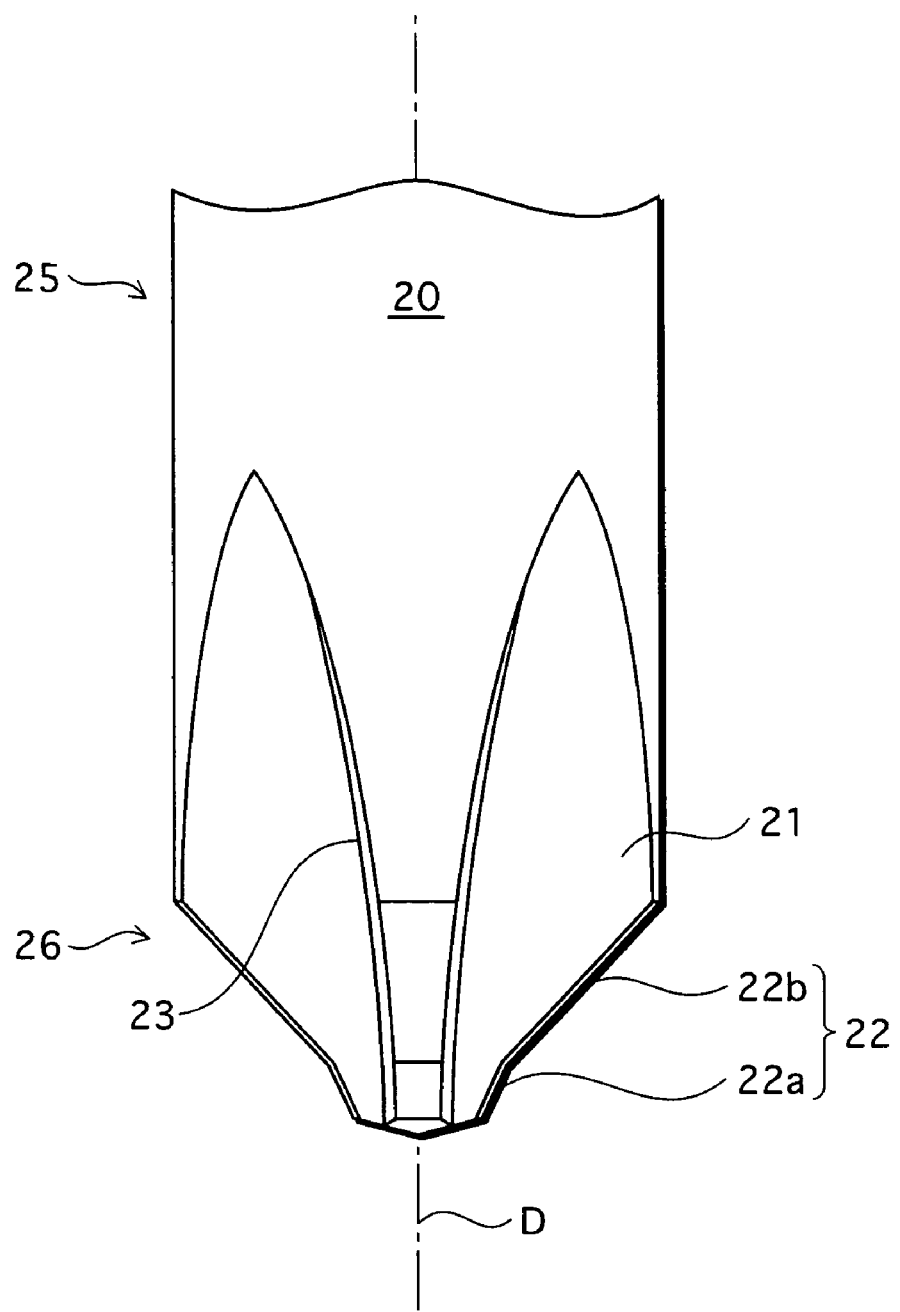
FIG. 4 is a front elevational view of a principal portion of a driver bit for use with the screw in FIG. 2.
Figure 5:
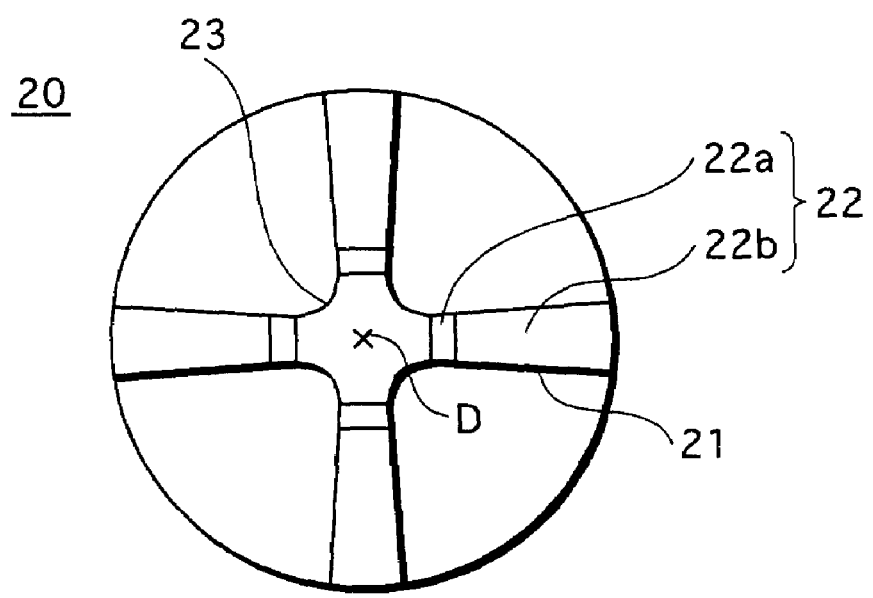
FIG. 5 is a bottom view of the driver bit in FIG. 4.

FIG. 4 is a front elevational view of the driver bit 20 according to this embodiment, and FIG. 5 is a bottom view of the drive bit 20 in FIG. 4.

As FIG. 4 shows, the driver bit 20 includes a drive shaft 25 and a drive head 26 formed at the tip of the drive shaft. As FIG. 5 shows, on the drive head 26, four engaging blades 21 are formed so as to be in cross-shape.

A surface 22, which includes one of the ridges of the engaging blades 21, consists of a steep slope 22a (the first slope), which is on the tip side and whose inclination angle to an axis D of the drive shaft is small, and a gentle slope 22b (the second slope), which is on the circumference side and whose inclination angle to the axis is larger than that of the steep slope 22a. The surface 22 is shaped so as to fit the bottom face 13 of the engaging groove 11 of the drive recess 10 of the screw 1.

Figure 6:
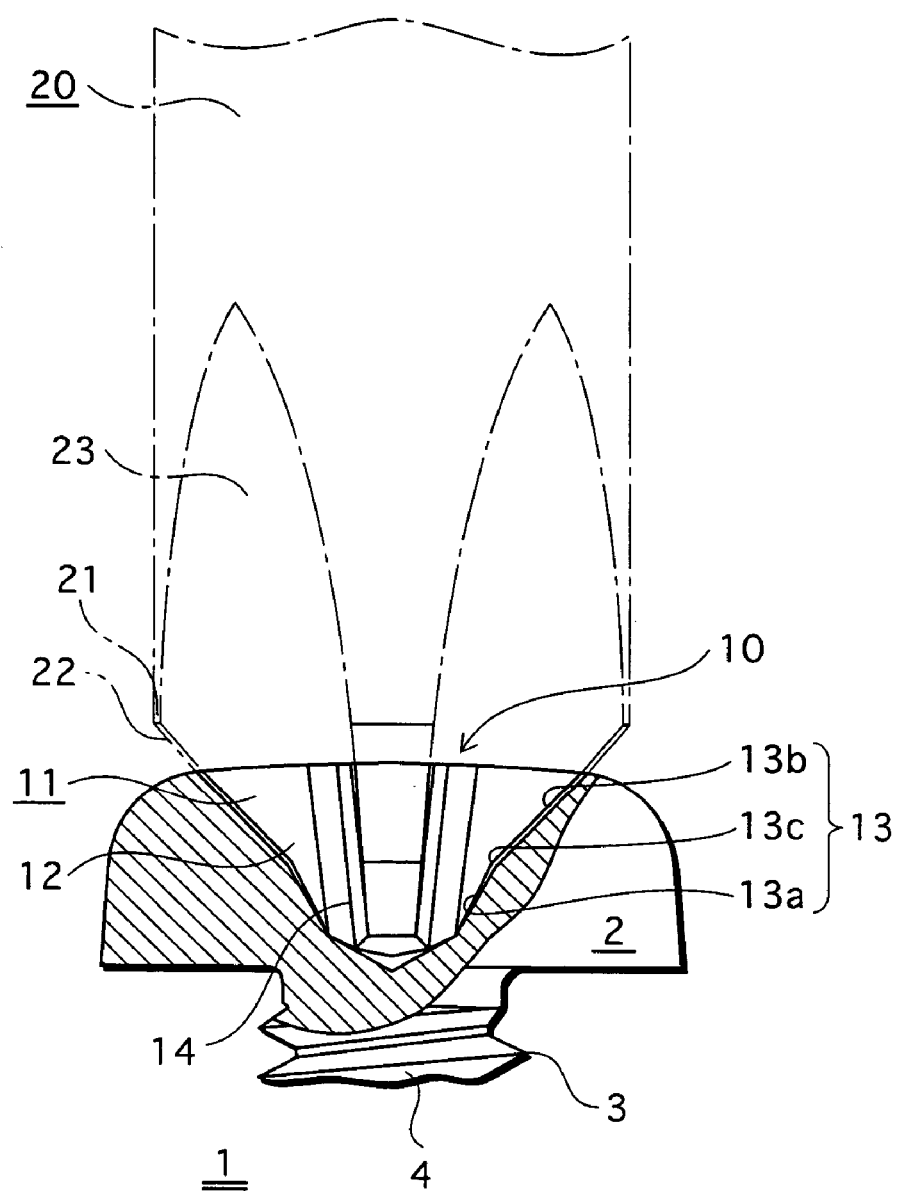
FIG. 6 is a sectional front view showing a principal portion where the drive recess of the screw in FIG. 2 and the driver bit in FIG. 4 are engaging with each other.

FIG. 6 shows that the drive head of the driver bit 20 is engaged with the drive recess 10 of the screw 1. (The driver bit is represented by a chain line for simplification.)

As FIG. 6 shows, the ridge of the engaging blade 21 of the driver bit 20 fits to the bottom face 13 of the engaging groove 11 of the screw 1, and this can maximize the contacting area between the engaging blade 21 of the driver bit 20 and the engaging wall 12 of the engaging groove 10 of the screw 1.

As FIG. 4 shows, a groove 23 is formed between adjacent two of the engaging blades 21 of the driver bit 20. Protrusions 14 (see FIG. 3) between the engaging grooves 11 of the screw 1 fit to the grooves 23, and so-called biting phenomenon occurs.

Note that in this embodiment, the distance "L" between facing two of each protrusion 14, which are between the engaging grooves 11 of the drive recess 10, is determined so that a little interspace is formed between the protrusions 14 and the bottom face of the corresponding groove 23 of the driver bit 20 when the drive head of the driver bit 20 is engaged with the drive recess 10.

This prevents excessive biting phenomenon even if the drive head of the driver bit 20 is pressed strongly against the drive recess 10. This means that a tightening failure is to be prevented. For instance, even when the screw 1 is fastened with an automated machine, such as an electric screwdriver, a workpiece is prevented from being lifted up when a tightening process finishes.

For tightening the screw 1 having the above-described drive recess 10 to a workpiece (not shown in the figures), the driver bit 20, which is specially made for the drive recess 10, is to be fit to the drive recess 10. By this, the engaging blades 21 are inserted into the engaging grooves 11 along with the bottom face 13. After that, driving force in the direction for tightening is applied to the driver bit 20. The driving force is transmitted via the engaging walls 12, the screw 1 is tightened to the workpiece, and parts (not show in the figures) are fixed to the workpiece.

The Second Embodiment

The following is a description of a screw according to the second embodiment of the present invention.

A screw 30 according to this embodiment has a thinner screw head than that of the screw 1 of the first embodiment, and this type of screw is called "a thin-head screw".

Figure 7:
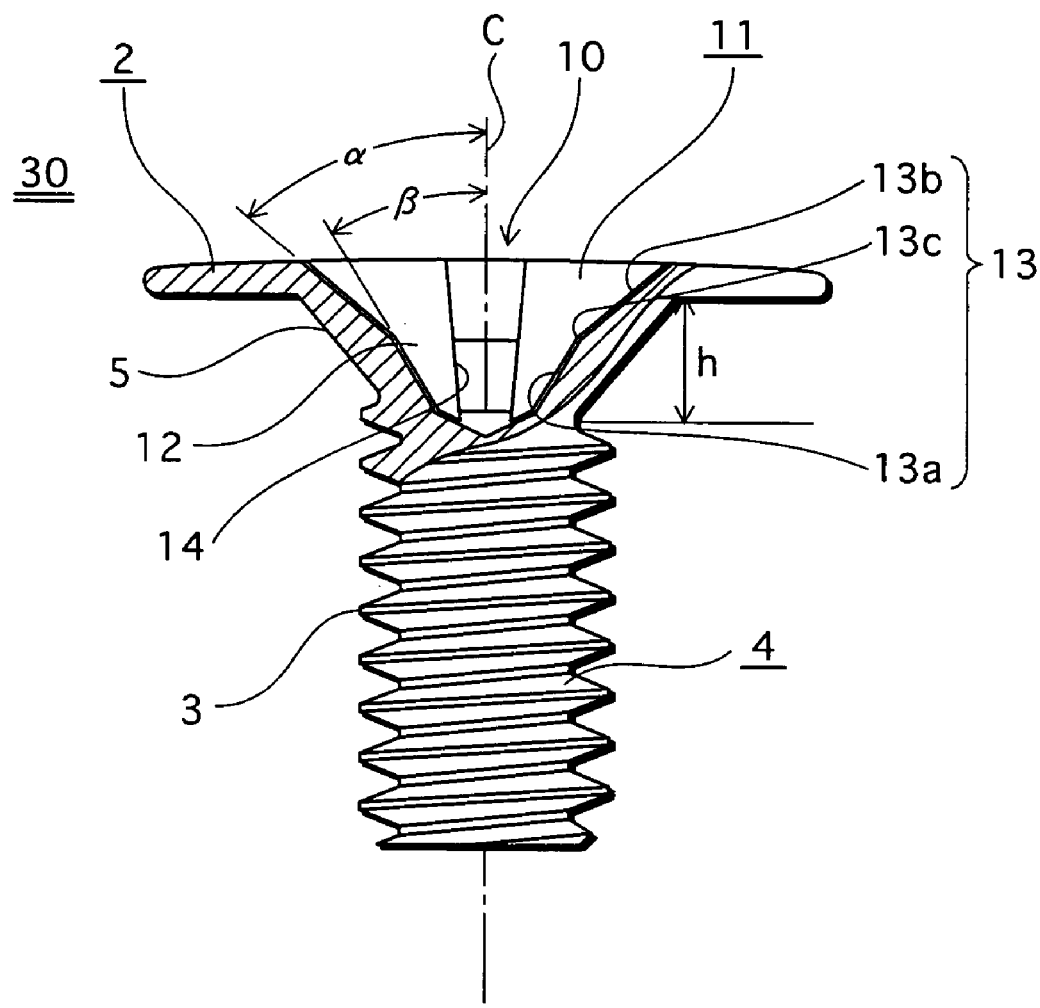
FIG. 7 is a cutaway view showing a shape of a principal portion of a screw according to the second embodiment of the present embodiment.
Figure 8:
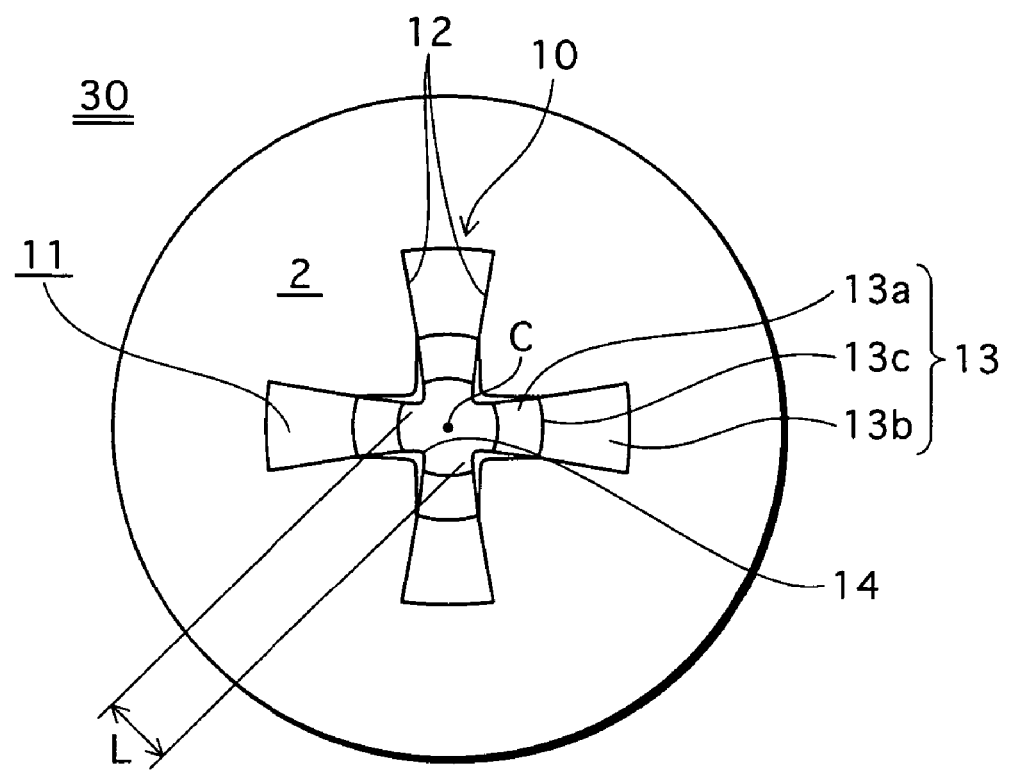
FIG. 8 is a plan view of a screw head of the screw in FIG. 7.

FIG. 7 is a cutaway front view of the screw 30, and FIG. 8 is a plan view of the screw head of the screw 30. In both figures, constituents numbered in the same manner as in FIG. 2 respectively represent the same constituents as those in FIG. 2.

As FIG. 7 shows, a reinforcing part 5, which is in shape of an inverted cone having a major part on the side near the screw head 2, is formed between the screw head 2 and the screw shank 4 of the screw 30. The reinforcing part 5 reinforces the neck portion of the screw 30 because the drive recess 10 of the screw head 2 is formed in such a manner as to reach the screw shank 4. A height "h" of the reinforcing part 5 in the direction of the axis C is set to a minimum (approximately 0.25 mm to 0.60 mm) according to the size of the screw in order to prevent a problem, such as so-called "stick-out" which is caused when the reinforcing part 5 contacts with a workpiece (not shown in figures) at the time of tightening.

On the screw head 2, the drive recess 10 is formed around the axis C just as in the first embodiment, and the drive recess 10 has four engaging grooves 11 radiating from the axis C as FIG. 8 shows.

The shape of the bottom face of each engaging groove 11 is the same as that of the first embodiment. Each engaging groove 11 has the bottom face 13 consisting of a steep slope 13a on the center side (near the screw shank) and a gentle slope 13b on the circumference side (far from the screw shank), and engaging walls 12 are formed as both side walls of each engaging groove 11.

By setting the gentle slope 13b in the bottom face 13 of the engaging groove 11, the depth of the drive recess 10 can be moderate and the engaging area to which the driver bit applies torque can be enlarged just as in the first embodiment.

With the stated construction, sufficient mechanical strength can be kept even if the height of the reinforcing part 5 in the direction of the axis C is decreased, and it becomes possible to decrease the possibility of the stick-out, which is caused when the reinforcing part 5 contacts with a workpiece. Also, by the enlarged engaging area where each engaging blade of the driver bit engages, it is possible to prevent that the drive recess is stripped off during screwing process.

Note that also in this embodiment, the distance "L" between facing two of the protrusions 14, which are between the engaging grooves 11 of the drive recess 10 (see FIG. 8), is determined so that a little interspace is formed between each protrusion 14 and the bottom face of the corresponding groove 23 of the driver bit 20 when the drive head of the driver bit 20 is engaged with the drive recess 10.

Also, the conditions in the first embodiment, such as the inclination angles $\alpha$ and $\beta$, the position of the shifting point from the steep slope 13a to the gentle slope 13b, are applied to the second embodiment as well. The conditions specified above, such as the inclination angles $\alpha$ and $\beta$, the position of the shifting point from the steep slope to the gentle slope and the height of the reinforcing part are favorable conditions especially for the thin-head screw, and the head coming-off phenomenon will be effectively prevented by the conditions.

Others (1) The above-described shape of the drive recess is especially effective when the screw is small (whose nominal diameters are approximately 1.2 mm–2.0 mm). However, it is also applicable to larger screws as a matter of course.

Figure 9:
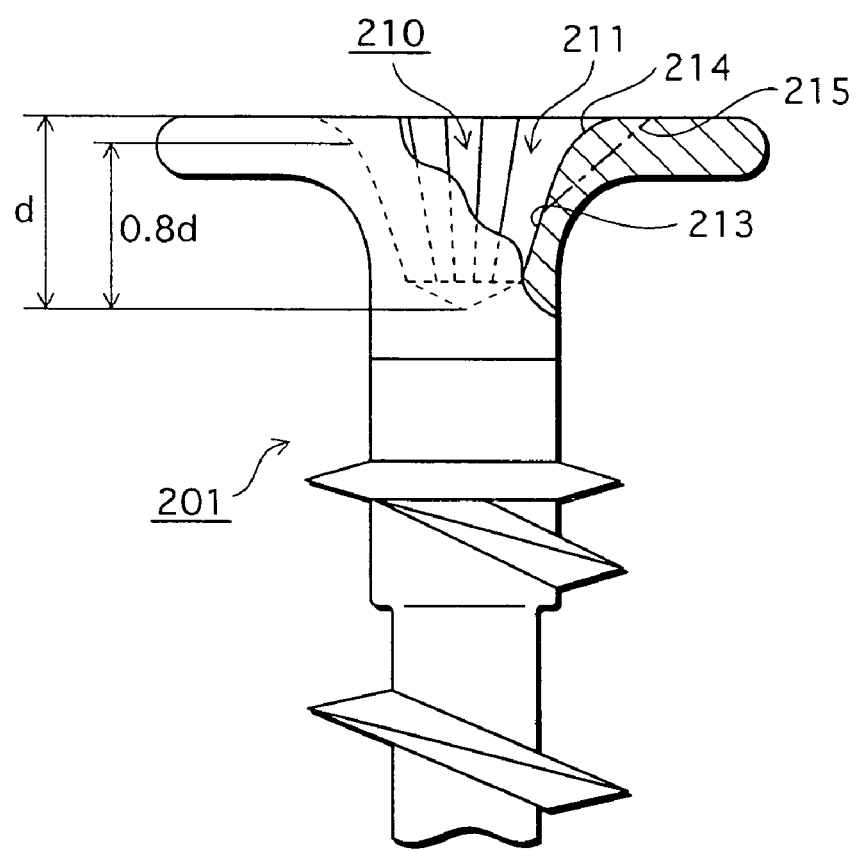
FIG. 9 shows a shape of a drive recess in another conventional screw as a comparative example.

(2) Note that as a shape of the drive recess of a screw, a tapping screw 201 as shown in FIG. 9 is disclosed in Japanese examined patent publication NO. 3-6365.

In this screw, on a part of a bottom face 213 of an engaging groove 211 in a drive recess 210, which is near to the circumference of the screw head, there is a portion 214 which slightly curves toward the circumference like an arc. The areas of engaging walls of the engaging groove 211 are larger than those of the conventional example shown in FIG. 1.

However, the invention described in the patent publication above (hereinafter called the published invention) aims to reduce shavings in powder form and prevent the shavings from being scattered when using a tapping screw to attach a ceiling material, such as a gypsum board, a plasterboard, a silicate calcium board, to a steel frame. The feature of the published invention is in the shape of the threads, and it does not consider the prevention of the stripping off of the drive recess at all, which is not like the present invention.

In the published invention, a part of the drive recess 210, which is near to the circumference of the screw head, is formed in such a manner as to slightly curve. However this is only for making insertion of the drive head of the driver bit into the drive recess easy.

Therefore, the essential difference between the published invention and the present invention is:

(a) In the present invention, for securing sufficient engaging area with which the drive head of the driver bit engages, the height of the shifting point from the steep slope to the gentle slope should be not less than 0.5d and not more than 0.7d when the depth of the driver recess 210 is d. This is represented by a chain line 215 in FIG. 9. However, in the screw 201, the slope curves toward the circumference from a position whose height is approximately 0.8d, therefore it is impossible to secure sufficient engaging area. This means that regarding the screw 201 described above, especially when its nominal diameter is small, strong driving force still causes a strip-off of the engaging groove.

(b) In the published invention, the rate of the steep slope of the bottom face 213 of the engaging groove 211 in the drive recess 210 is higher as described above. Therefore, the thrust applied to the driver bit along the axis C of the screw is dispersed, and accordingly, the pushing force applied to the screw 201 toward the direction of the screwing becomes weaker. Further, when torque is applied to the driver bit, the driver bit often slides up the drive recess 210 (the come-out phenomenon) and comes out from the engaging groove 211. This also can strip off the engaging groove 211.

(c) Regarding the published invention, the bottom face 213 of the engaging groove 211 curves toward the circumference of the screw head. Therefore, it is difficult to secure large area in the engaging blade compared to the case where the sectional view of the bottom face is in shape of a straight line as in the screw of the present invention.

(d) Further, when forming the bottom face of the engaging groove so as to be in shape of an arc as in the published invention, it is difficult to precisely form a metal mold for a punch used for press forming. In addition, the depth of the engaging groove of the drive recess needs to be controlled according to the size of the screw, but it is difficult to identify the starting point for measuring the depth of the groove because of the arc-shape of the bottom face, and therefore the published invention often suffer a problem of manufacturing control, which means that the measured values are different from each measurer.

In contrast, according to the present invention, the cut surfaces of the steep slope and the gentle slope cut along a plane including the axis C are straight lines or curves which are almost straight. Therefore, the present invention hardly suffers such a problem.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A screw, comprising:
a screw head having a drive recess which is for engagement with a drive head of a driver bit; and
a screw shank having threads and being integrally formed with the screw head, wherein
the drive recess includes a plurality of engaging grooves equiangularly radiating from an axis of the screw in plan view, a cross section of a bottom face of each engaging groove cut along a plane including the axis of screw including a first straight line and a second straight line.
a first portion of the first straight line is nearer to the screw shank than second straight line, and
an inclination angle $\alpha$ of the second straight line to the axis of the screw is larger than an inclination angle $\beta$ of the first straight line to the axis of the screw.

2. The screw of claim 1, wherein
the inclination angle $\alpha$ is less than or equal to twice the inclination angle $\beta$.

3. The screw of claim 1, wherein
when a depth of the drive recess in a direction of the axis is d, a height of a boundary between the first straight line and the second straight line from a starting point is within a range of 0.5d to 0.7d, the starting point being at a deepest position in the drive recess.

4. A driver bit having a drive shaft and a drive head formed on a tip of the drive shaft, the drive head being for engagement with the drive recess of claim 1, the driver bit comprising:
a plurality of engaging blades formed on the drive head so as to equiangularly radiate from an axis of the shaft in plan view, wherein
a surface of each engaging blade including a ridge thereof has a first blade slope and a second blade slope,
the first blade slope is nearer to the tip of the drive head, and
an inclination angle of the second blade slope to the axis of the drive shaft is larger than an inclination angle of the first blade slope to the axis of the drive shaft.

5. The driver bit of claim 4, wherein
when the drive head is engaged with the drive recess of claim 1, the surface of each engaging blade fits surfaces of the first straight line and the second straight line of each engaging groove included in the drive recess.

* * * * *